(12) United States Patent
Beaver

(10) Patent No.: US 11,960,847 B2
(45) Date of Patent: Apr. 16, 2024

(54) SYSTEMS AND METHODS FOR GENERATING RESPONSES FOR AN INTELLIGENT VIRTUAL

(71) Applicant: Verint Americas Inc., Alpharetta, GA (US)

(72) Inventor: Ian Beaver, Spokane, WA (US)

(73) Assignee: Verint Americas Inc., Alpharetta, GA (US)

( * ) Notice: Subject to any disclaimer, the term of this patent is extended or adjusted under 35 U.S.C. 154(b) by 464 days.

(21) Appl. No.: 16/835,975

(22) Filed: Mar. 31, 2020

(65) Prior Publication Data

US 2020/0320134 A1 Oct. 8, 2020

Related U.S. Application Data

(60) Provisional application No. 62/829,268, filed on Apr. 4, 2019.

(51) Int. Cl.
*G06F 40/35* (2020.01)
*G06F 16/9032* (2019.01)
(Continued)

(52) U.S. Cl.
CPC ........ *G06F 40/35* (2020.01); *G06F 16/90332* (2019.01); *G06F 18/2178* (2023.01); *G06N 20/00* (2019.01)

(58) Field of Classification Search
CPC .......... G06F 40/30; G06F 40/35; G06F 40/56; G06F 16/3329; G06F 16/353;
(Continued)

(56) References Cited

U.S. PATENT DOCUMENTS 10,235,999 B1 * 3/2019 Naughton ............... G10L 15/02
10,388,272 B1 * 8/2019 Thomson ................ G10L 15/22
(Continued)

FOREIGN PATENT DOCUMENTS

| AU | 2017204359 B2 * | 8/2018 | ......... G06F 16/3329 |
| WO | WO-2011044303 A2 * | 4/2011 | .......... G06F 19/363 |
| WO | 2016/071917 | 5/2016 | |

OTHER PUBLICATIONS

Beaver, I. (2018). Automatic Conversation Review for Intelligent Virtual Assistants (Doctoral dissertation, The University of New Mexico). (Year: 2018).*

(Continued)

*Primary Examiner* — Dennis Truong
(74) *Attorney, Agent, or Firm* — Meunier Carlin & Curfman LLC

(57) ABSTRACT

Systems and methods are described to automatically generate candidate questions and responses to speed the process of response creation and editing for commercial IVAs and chatbots. Rather than create the questions and responses from scratch for a new IVA, the system uses existing questions and responses from a previous or related IVA to train a model that can generate proposed responses to provided questions. The model, or a different model, can further be trained to generate responses using data taken from company or entity-specific data sources such as websites and knowledge bases. After a set of questions and responses have been generated for an IVA they may be reviewed by one or more human reviewers to ensure they are of a suitable quality. Where no previous or related IVA exists to provide example responses, the model may be trained solely using the company or entity-specific data.

20 Claims, 5 Drawing Sheets

(51) Int. Cl.
*G06F 18/21* (2023.01)
*G06N 5/04* (2023.01)
*G06N 20/00* (2019.01)

(58) Field of Classification Search
CPC ... G10L 15/18; G10L 15/1822; G10L 15/183; G10L 15/1815; G10L 15/063; G10L 25/63; H04L 51/02; G06N 5/022; G06N 20/00

See application file for complete search history.

(56) References Cited

U.S. PATENT DOCUMENTS

| | | | |
|---|---|---|---|
| 10,929,392 B1* | 2/2021 | Cheng | G06F 16/242 |
| 11,425,215 B1* | 8/2022 | Lewis | G06F 9/4881 |
| 11,599,729 B2* | 3/2023 | Wu | G06N 3/045 |
| 2007/0198368 A1 | 8/2007 | Kannan et al. | |
| 2008/0249658 A1 | 10/2008 | Walker et al. | |
| 2009/0077047 A1* | 3/2009 | Cooper | G06F 16/3344 |
| 2010/0030648 A1 | 2/2010 | Manolescu et al. | |
| 2010/0286985 A1* | 11/2010 | Kennewick | G10L 15/22 704/257 |
| 2013/0007055 A1* | 1/2013 | Brown | F16H 3/54 707/769 |
| 2013/0336465 A1 | 12/2013 | Dheap et al. | |
| 2015/0186154 A1* | 7/2015 | Brown | G06Q 50/20 715/706 |
| 2016/0048514 A1* | 2/2016 | Allen | G06F 16/24522 707/731 |
| 2016/0062604 A1* | 3/2016 | Kraljic | G06F 3/0483 715/771 |
| 2016/0071517 A1* | 3/2016 | Beaver | G06F 40/35 704/9 |
| 2016/0196561 A1 | 7/2016 | Iyer et al. | |
| 2016/0247068 A1* | 8/2016 | Lin | G06F 40/40 |
| 2016/0300023 A1 | 10/2016 | Leonard | |
| 2016/0308799 A1* | 10/2016 | Schubert | H04L 67/535 |
| 2017/0046246 A1 | 2/2017 | Kaulgud et al. | |
| 2018/0032902 A1* | 2/2018 | Krishnan | G06N 20/00 |
| 2018/0115645 A1* | 4/2018 | Iyer | G06Q 10/063112 |
| 2018/0121508 A1* | 5/2018 | Halstvedt | G06F 16/24545 |
| 2018/0232127 A1* | 8/2018 | Sharifi | G06Q 10/107 |
| 2018/0293484 A1* | 10/2018 | Wang | G06F 16/632 |
| 2018/0358001 A1* | 12/2018 | Amid | G06F 16/3329 |
| 2019/0034950 A1 | 1/2019 | Roux et al. | |
| 2019/0042185 A1* | 2/2019 | Young | G06F 3/167 |
| 2019/0065576 A1* | 2/2019 | Peng | G06F 16/22 |
| 2019/0156222 A1* | 5/2019 | Emma | G06N 5/041 |
| 2020/0034893 A1 | 1/2020 | Anders et al. | |
| 2020/0065680 A1* | 2/2020 | Cheng | G06F 16/90332 |
| 2020/0167417 A1* | 5/2020 | Li | G06K 9/6298 |
| 2020/0311145 A1* | 10/2020 | Li | G06F 16/90332 |
| 2021/0350209 A1* | 11/2021 | Wang | G06F 16/3344 |

OTHER PUBLICATIONS

M. Singh et al., "KNADIA: Enterprise KNowledge Assisted DIAlogue Systems Using Deep Learning," 2018 IEEE 34th International Conference on Data Engineering (ICDE), 2018, pp. 1423-1434, doi: 10.1109/ICDE.2018.00161. (Year: 2018).*

Zhang, WN., Zhu, Q., Wang, Y. et al. Neural personalized response generation as domain adaptation. World Wide Web 22, 1427-1446. https://doi.org/10.1007/s11280-018-0598-6 (Year: 2018).*

Bao, J., et al., "Question Generation With Doubly Adversarial Nets," IEEE/ACM Transactions on Audio, Speech, and Language Processing, vol. 26, No. 11, 2018, pp. 2230-2239.

International Search Report and Written Opinion, dated Jul. 21, 2020, received in connection with International Patent Application No. PCT/US2020/025882.

Prakash, A., "How to Track and Monitor Social Media for Better Business opportunity?," retrieved from https://www.socialpilot.co/blog/how-to-monitor-social-media, 2018, 11 pages.

* cited by examiner

SYSTEMS AND METHODS FOR GENERATING RESPONSES FOR AN INTELLIGENT VIRTUAL

CROSS-REFERENCE TO RELATED APPLICATIONS

This application claims the benefit of priority to U.S. Provisional Patent Application No. 62/829,268, filed on Apr. 4, 2019, entitled "Automated Generation of Candidate Questions and Responses in Conversational Natural Language Generation," the contents of which are hereby incorporated by reference in its entirety.

BACKGROUND

Intelligent Virtual Assistants (IVAs), chatbots, and other conversational agents employ a Natural Language Understanding (NLU) component to map natural language inputs to user intentions, which are class labels allowing for the generation of the best possible response to the input. Once the intention(s) are known, IVAs rely on Natural Language Generation (NLG) techniques to respond to human users. NLG can be performed using a variety of techniques including, but not limited to, static text, static templates rendered with dynamic variables, dynamically composed template or grammar fragments, and fully dynamic text generated by a model trained on domain specific transcripts or texts.

As businesses want to ensure the IVA is responding appropriately, commercial IVA systems use databases of human-approved responses or response fragments and templates in the NLG component. This prevents the IVA from misrepresenting the company by saying something to their customers that is inaccurate. In creating these responses or templates, the full set of user intentions must first be defined. Once the set (or a subset) of user intentions is known, humans determine one or more appropriate responses for each intent. These responses may be full texts or templates that are rendered using variables during run time such as the current day or a username. It can be challenging for novice conversation designers to create responses de novo as they must consider all of the language that could match a given intention and what language to use in response. In addition, this work is time consuming and tedious with hundreds or thousands of responses to create for an average IVA.

SUMMARY

Systems and methods are described to automatically generate candidate questions and responses to speed the process of response creation and editing for commercial IVAs and chatbots. Rather than create the questions and responses from scratch for a new IVA, the system uses existing questions and responses from a previous or related IVA to train a model that can generate proposed responses to provided questions. The model, or a different model, can further be trained to generate responses using data taken from company or entity-specific data sources such as websites and knowledge bases. After a set of questions and responses have been generated for an IVA they may be reviewed by one or more human reviewers to ensure they are of a suitable quality. Where no previous or related IVA exists to provide example responses, the model may be trained solely using the company or entity-specific data.

In an implementation, a method for generating responses for use by an intelligent virtual assistant is provided. The method includes: receiving data associated with an entity by a computing device; training a question model and a response model using at least some of the received data by the computing device; using the question model to generate a plurality of questions by the computing device; for each question, assigning an intent to the question by the computing device; for each question, using the response model to generate a response by the computing device; and providing the questions, assigned intents, and generated responses for use by an intelligent virtual assistant for the entity by the computing device.

Implementations may include some or all of the following features. The method may include providing the plurality of question to a human reviewer. The method may include assigning an intent to each question comprises generating a mapping of questions to intents. The method may include providing the mapping to a human reviewer. The method may include providing the generated responses to a human reviewer. The method may include transforming the received data into a format used by the question model or the response model. The question model and the response model may be a single model. Assigning an intent to a question may include providing the question to the intelligent virtual assistant and receiving the intent from the intelligent virtual assistant. The responses may include one or more response templates.

In an implementation, a method for generating responses for use by an intelligent virtual assistant is provided. The method includes: receiving a first plurality of responses used by a first intelligent virtual assistant by a computing device; training a first response model using the first plurality of responses by the computing device; receiving data associated with an entity by the computing device; training a second response model using the received data by the computing device; receiving a plurality of question and intent pairs by the computing device; generating a second plurality of responses using the first and second response models using the plurality of question and intent pairs by the computing device; and providing the plurality of question and intent pairs and generated second plurality of responses for use by a second intelligent virtual assistant for the entity by the computing device.

Implementations may include some or all of the following features. The method may further include adapting the first response model using the received data. The method may further include transforming the received data into a format used by the second response model. The second plurality of responses may include one or more response templates. The method may further include providing the second plurality of responses for human review.

In an implementation, a system for generating responses for use by an intelligent virtual assistant is provided. The system includes at least one processor and a non-transitory computer readable medium comprising instructions that, when executed by the at least one processor, cause the system to: receive data associated with an entity; train a question model and a response model using at least some of the received data; use the question model to generate a plurality of questions; for each question, assign an intent to the question; for each question, use the response model to generate a response; and provide the questions, assigned intents, and generated responses for use by an intelligent virtual assistant for the entity.

Implementations may include some or all of the following features. The system may further include instructions that, when executed by the at least one processor, cause the system to provide the plurality of question to a human reviewer. Assigning an intent to each question may include generating a mapping of questions to intents. The system may further include instructions that, when executed by the at least one processor, cause the system to provide the mapping to a human reviewer. The system may further include instructions that, when executed by the at least one processor, cause the system to provide the generated responses to a human reviewer. The system may further include instructions that, when executed by the at least one processor, cause the system to transform the received data into a format used by the question model or the response model.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
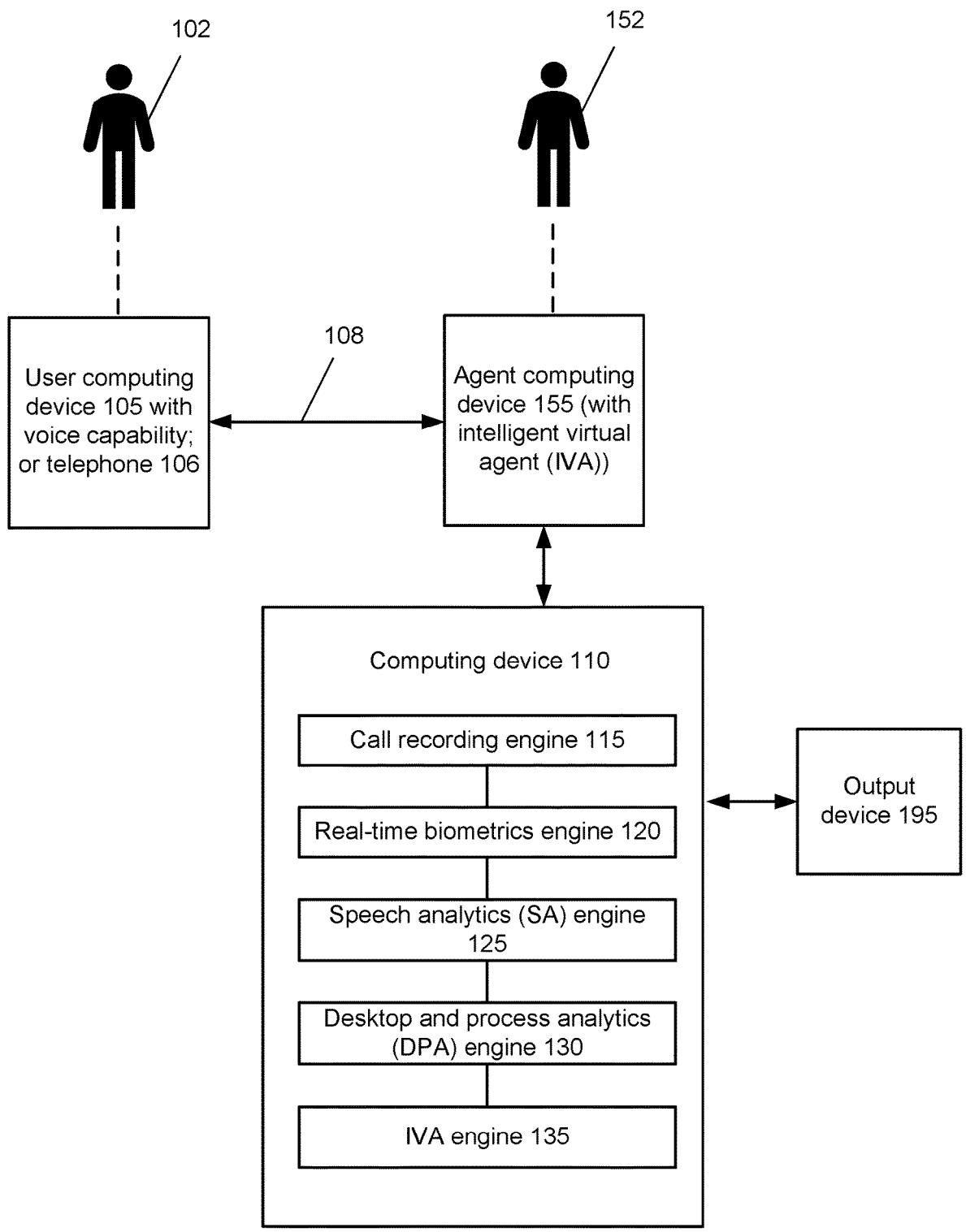
FIG. 1 is an illustration of an exemplary environment for operating an intelligent virtual agent.

FIG. 1 is an illustration of an exemplary environment 100 for operating an intelligent virtual assistant (IVA). A user 102, using a user computing device 105 with voice capability or using a telephone 106 contacts an entity through a network 108. More particularly, the user 102 contacts an agent 152 (or representative, employee, associate, etc.) of a company using the user computing device 105 or the telephone 106 in communication with an agent computing device 155 via the network 108. The agent computing device 155 has human voice capability. Additionally, or alternatively, the agent computing device 155 has IVA capability.

A computing device 110 may be in communication with the agent computing device 155 to monitor the speech in a voice call (i.e., the conversation) between the user computing device 105 (or the telephone 106) and the agent computing device 155. The computing device 110 may be implemented in, or embodied in, a desktop analytics product or in a speech analytics product, in some implementations. Depending on the implementation, an output device 195 may be in communication with the computing device 110, in either a wired connection or a wireless connection.

The network 108 may be a variety of network types including the public switched telephone network (PSTN), a cellular telephone network, and a packet switched network (e.g., the Internet). Although only one user computing device 105/telephone 106, one agent computing device 155, one computing device 110, and one output device 195 are shown in FIG. 1, there is no limit to the number of computing devices 105, 155, 110, telephones 106, and output devices 195 that may be supported.

Figure 5:
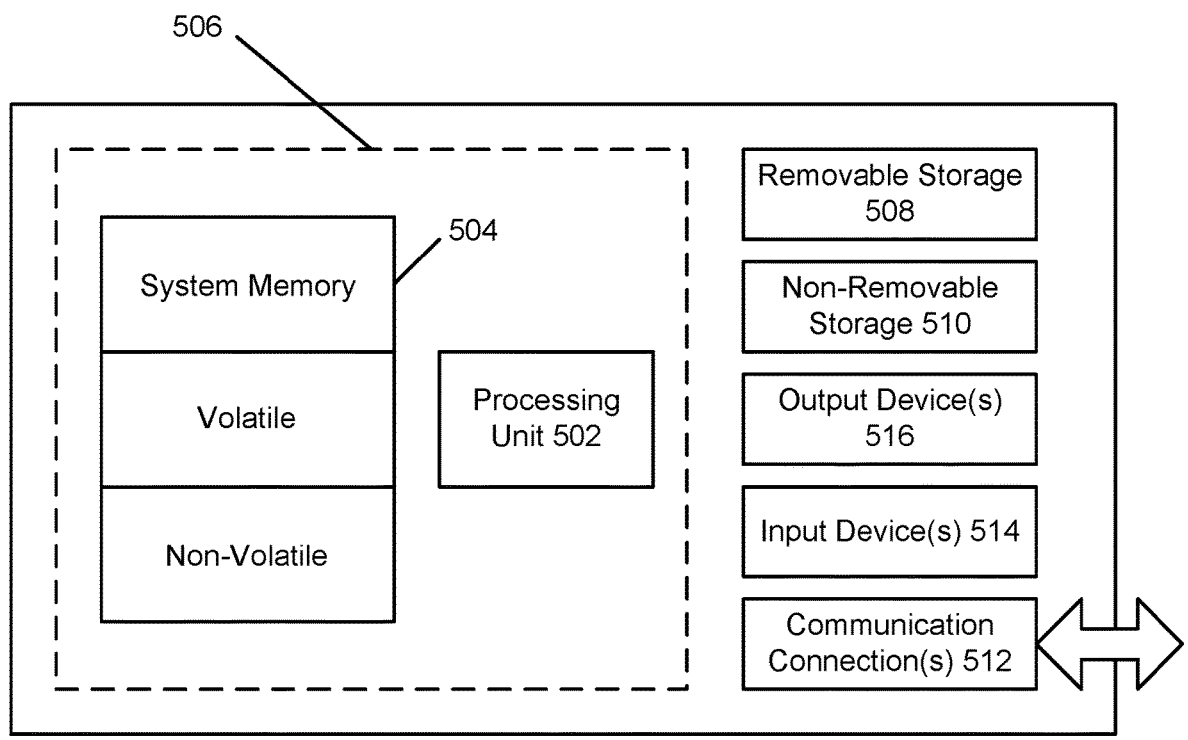
FIG. 5 shows an exemplary computing environment in which example embodiments and aspects may be implemented.

The user computing device 105, the agent computing device 155, the computing device 110, and the output device 195 may each be implemented using a variety of computing devices such as smartphones, desktop computers, laptop computers, tablets, set top boxes, vehicle navigation systems, and video game consoles. Other types of computing devices may be supported. A suitable computing device is illustrated in FIG. 5 as the computing device 500.

In some implementations, the computing device 110 comprises a call recording engine 115, a real-time biometrics engine 120, a speech analytics (SA) engine 125, a desktop and process analytics (DPA) engine 130, and an IVA engine 135. As described further herein, the computing device 110 and its various engines 115, 120, 125, 130, and 135 assist the agent 152 in providing better service and information to the user 102. The computing device 110 recognizes conditions based on the conversation between the user 102 and the agent 152 in different ways and contexts. More complex rules and actions may be implemented based on what the user 102 and/or the agent 152 is saying and doing (e.g., actions they are taking) and based on the history of the phone call and conversation between the user 102 and the agent 152.

The call recording engine 115 captures the interaction between the user computing device 105 (or the telephone 106) and the agent computing device 155. Additionally, the call recording engine 115 may capture computer telephony integration (CTI) events, and also be used to set rules for analysis.

The real-time biometrics engine 120 authenticates the user 102, e.g., by analyzing the speech of the user 102 as received from the user computing device 105 (or the telephone 106). The authentication is performed in real-time when the user 102 calls the agent computing device 155. Any type of voice or speech biometrics authentication may be used.

The SA engine 125 analyzes and automatically categorizes calls. The SA engine 125 also publishes categories to RTSA rules. The SA engine 125 provides phonetic recognition and full transcription of calls, utilizing advanced language understanding.

The DPA engine 130 incorporates desktop events at the agent computing device 155 for broader and richer interaction context between the user 102 and the agent 152 (e.g., between the user computing device 105 and the agent computing device 155). The DPA engine 130 may drive notification and automation.

The IVA engine 135 implements one or more IVAs for the computing device 110 and/or the agent computing device 155. Generally, the IVA engine 135 uses an NLU model to map natural language inputs received from the conversation between the user 102 and the IVA during a call to one or more user intents. The IVA engine 135 can then use the determined intents to generate a response that is provided (e.g., spoken or displayed) to the user 102.

The IVA engine 135 may generate the response from a database of human-approved responses. These responses may include full-text responses or templates that are rendered by the IVA engine 135 at run-time. As may be appreciated, generating and reviewing a set of responses for an IVA is extremely challenging and time consuming given all of the possible intents and languages that may be supported. Modern IVAs often have hundreds or thousands of possible responses.

Figure 2:
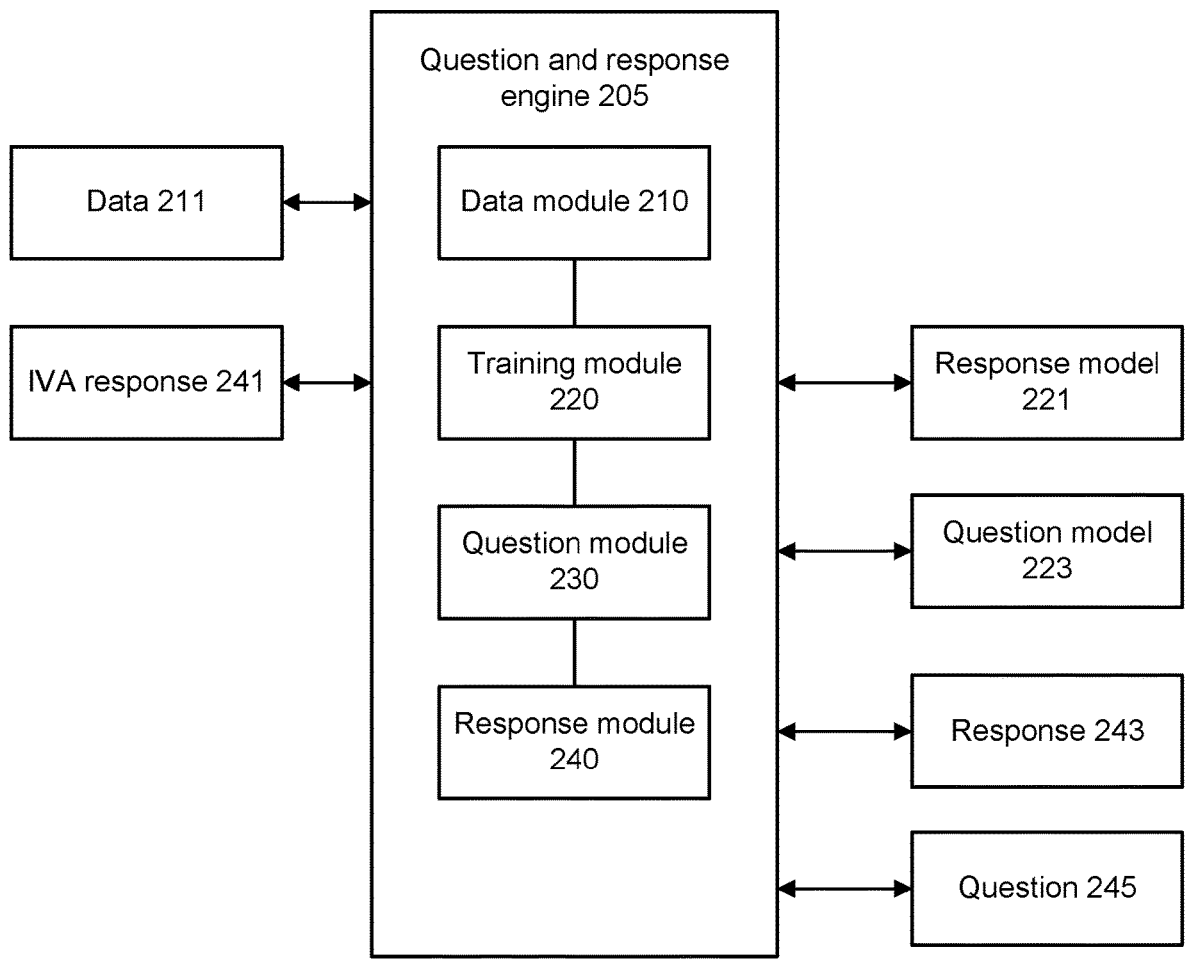
FIG. 2 is a diagram of an example question and response engine.

FIG. 2 is an illustration of a question and response engine 205 that quickly and efficiently generates questions 245 and/or responses 243 for an IVA. These questions 245 and/or responses 243 can be reviewed by a human reviewer and used by the IVA engine 135 to implement an IVA. Because the question and response engine 205 generates the questions 245 and/or responses 243 without user input, new IVAs can be quickly created and deployed at a much faster speed, and with a much lower cost, than previous IVAs. Accordingly, the question and response engine 205 as described herein is an improvement to the fields of customer service and call or communication routing.

In the example shown, the question and response engine 205 includes several components or modules including, but not limited to, a data module 210, a training module 220, a question module 230, and a response module 240. More or fewer modules may be supported. The various modules of the question and response engine 205 may be implemented together, or in part, by the computing device 500 illustrated with respect to FIG. 5.

The question and response engine 205 may generate a plurality of responses 243 that may be used by the IVA engine 135 to respond to received questions 245 according to determined intents. Depending on the embodiment, the question and response model 221 may also generate questions 245 and associated intents for use by the IVA engine 135.

The question and response engine 205 may operate in one of two modes. In a first mode, the question and response engine 205 may generate responses based only on data 211 that is collected about an entity or company. In a second mode, the question and response engine 205 may consider the data 211 collected about the entity or company but may also consider a set of responses 243 used by a previous or related IVA. These two modes are described in further detail below.

As part of the first mode, the data module 210 may collect data 211 about a company or entity that will use the IVA. The data module 210 may collect the data 211 from a variety of sources associated with the entity such as an entity website, internal documents or knowledge bases, and call or chat transcripts. Other data sources may be used. Depending on the embodiment, the data module 210 may further clean or process the collected data 211 into a standard format.

The training module 220 may use the data 211 to train one or both of a question model 223 and a response model 221. The question model 223 may be a model that is trained to generate a set of candidate questions 245 based on input such as the data 211. The response model 221 may be a model that is trained to generate one or more responses 243 based on an input question 245 and an intent. Any method for training and/or generating a prediction model may be used.

After the models are trained, the question module 230 may use the question model 223 to generate a set of candidate questions 245 from the data 211. The candidate questions 245 may be meant to simulate the questions 245 that are likely to be asked by customers of the company or entity during conversations with the IVA. Depending on the embodiment, the generated questions 245 may be provided to one or more human reviewers who may review the generated questions 245 based on a variety of factors such as grammar and relevance. The reviewers may edit one or more of the questions 245, delete one or more of the questions 245, or may add one or more additional questions 245.

After generating the questions 245, the question module 230 may associate each question 245 with an intent. Depending on the embodiment, the question module 230 may generate the intents by feeding each question into the IVA and having the NLG component of the IVA determine the intents. Alternatively, the intents may be generated by human reviewers. The resulting question to intent mapping may be reviewed by one or more human reviewers who may add additional intents to the mapping.

The response module 240 may receive the generated questions 245 and intents and may use the response model 221 to generate one or more responses 243 for each question 245. The generated responses 243 may be saved by the response module 240 with each question 245 and associated intent. Depending on the embodiment, some of the generated responses may be response templates that include placeholders that can be filled by the IVA using contextual information.

After generating the responses 243, the response module 240 may have one or more human reviewers review the proposed responses 243 for each question 245. The reviewers may review the responses 243 for accuracy, grammar, and compliance with entity or company brand standards. The reviewers may remove proposed responses 243, edit proposed responses 243, or may add new proposed responses 243.

Once at least one response 243 has been approved for each intent, the response module 240 may provide the generated questions 245 and responses 243 for use by the IVA engine 135.

As part of the second mode, the training module 220 may receive a plurality of IVA responses 241 that are currently being used by an IVA. The IVA may have a similar purpose or may be associated with a similar vertical as the IVA being trained. The IVA responses 241 may be associated with the same entity or company as the IVA being trained or may be associated with a different entity or company. The training module 220 may use the IVA responses 241 to train a first response model 221. Depending on the embodiment, the first response model 221 may receive an intent or question 245 and may output one or more suitable responses 243.

The IVA associated with the IVA responses 241 may have similar capabilities as the IVA being trained but may still lack many of the customer-specific words or phrases that are needed. To correct this, the training module 220 may further receive data 211 about the entity or company from the data module 210. As described above, the data 211 may include data scraped from sources like websites and internal knowledge bases. The training module 220 may use the data 211 to adapt the response model 221 to the specific entity or company. Depending on the embodiment, the training module 220 may adapt the model 221 using a variety of well-known machine learning techniques such as transfer learning, few-shot learning, and domain adaptation. Other methods may be used.

In addition, the training module 220 may generate a second response model 221 using only the data 211 received from the data module 210. Any method for generating a model 221 from data 211 may be used.

The question module 230 may receive a plurality of questions 245 and intent pairs. The pairs may be received from an entity or company-specific database of questions and intents. In other embodiments, some or all of the questions 245 may be generated by the question module 230 using a question model 223 as described above.

The response module 240 may generate one or more responses 243 for each question and intent pair using both of the response models 221. Similarly, as described above, each generated response 243 may be reviewed and/or edited by a human reviewer to ensure that each proposed response 243 meets certain quality and accuracy guidelines. Once a response 243 has been approved for each question and intent pair, the responses 243 may be provided to the IVA engine 135 and incorporated into an IVA.

Figure 3:
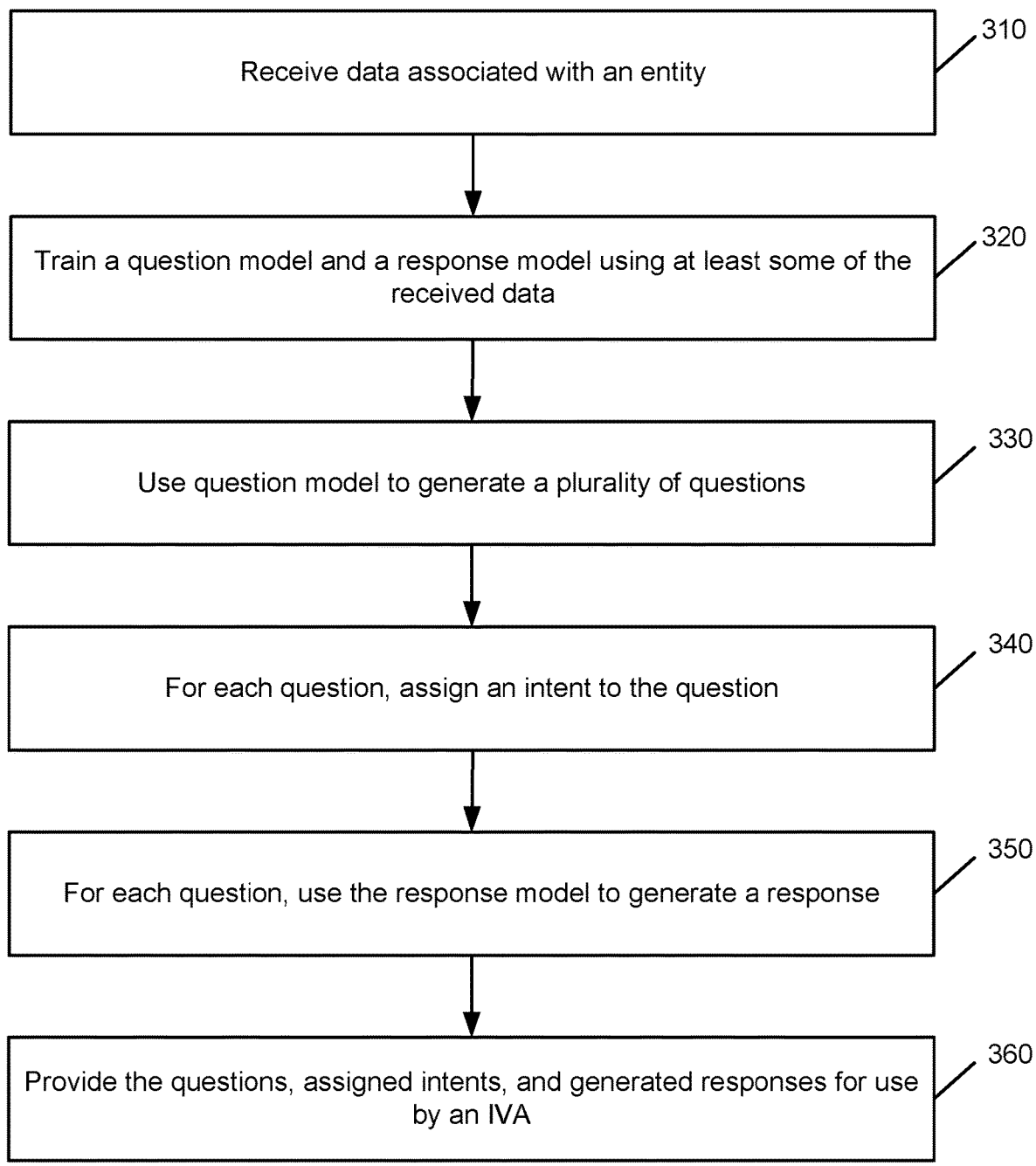
FIG. 3 is an operational flow of an implementation of a method for generating questions and/or responses for an intelligent virtual agent without example responses.

FIG. 3 is an operational flow of an implementation of a method 300 for generating questions and/or responses without example responses. The method 300 may be implemented by the question and response engine 205. The method 300 may be used to generate questions and/or responses for an IVA when no suitable example responses are available.

At 310, data associated with an entity is received. The data 211 may be received by the data module 210. The data 211 may be associated with an entity such as a company, business, or corporation. The entity may be setting up an IVA and may not have any example responses to use to train the IVA. The data 211 may be received from websites, internal documents, and other sources associated with the entity. The data 211 may include chat or agent transcripts collected by the entity, for example.

At 320, a question model and a response model are trained using at least some of the received data. The question model 223 and response model 221 may be trained using at least some of the received data 211 by the training module 220. Any method for training a module using data 211 may be used. Depending on the embodiment, the training module 220 may first normalize or transform the data 211 into a standard format that can be used to train the models 221 and 223.

At 330, the question model is used to generate a plurality of questions. The plurality of questions 245 may be generated by the question module 230 using the question model 223 and the data 211. The questions 245 may be questions that are relevant to the entity as determined from the data 211 provided by the entity (e.g., data from the entity website or from internal documents).

Depending on the embodiment, the generated questions 245 may be provided to one or more human reviewers to review. The reviewers may modify some the questions 245, may remove some of the questions 245, or may add additional questions 245.

At 340, an intent is assigned to each question. The intent may be assigned to each question 245 by the question module 230. In some embodiments, the intents may be assigned by one or more human reviewers. In other embodiments, the intents may be assigned by the IVA associated with the entity. The questions 245 and assigned intents may form a mapping from questions to intents and/or a set of question and intent pairs.

At 350, a response is generated for each question. The response or responses 243 may be generated for each question 245 by the response module 240 using the response model 221. Depending on the embodiment, the generated responses 243 may be reviewed by one or more reviewers who may add, remove, or edit the proposed responses 243. Some of the generated responses 243 may be templates and may include placeholder tags that may depend on contextual information.

At 360, the questions, assigned intents, and generated responses are provided for use by the IVA. The questions 245, intents, and responses 243 may be provided by the question and response engine 205.

Figure 4:
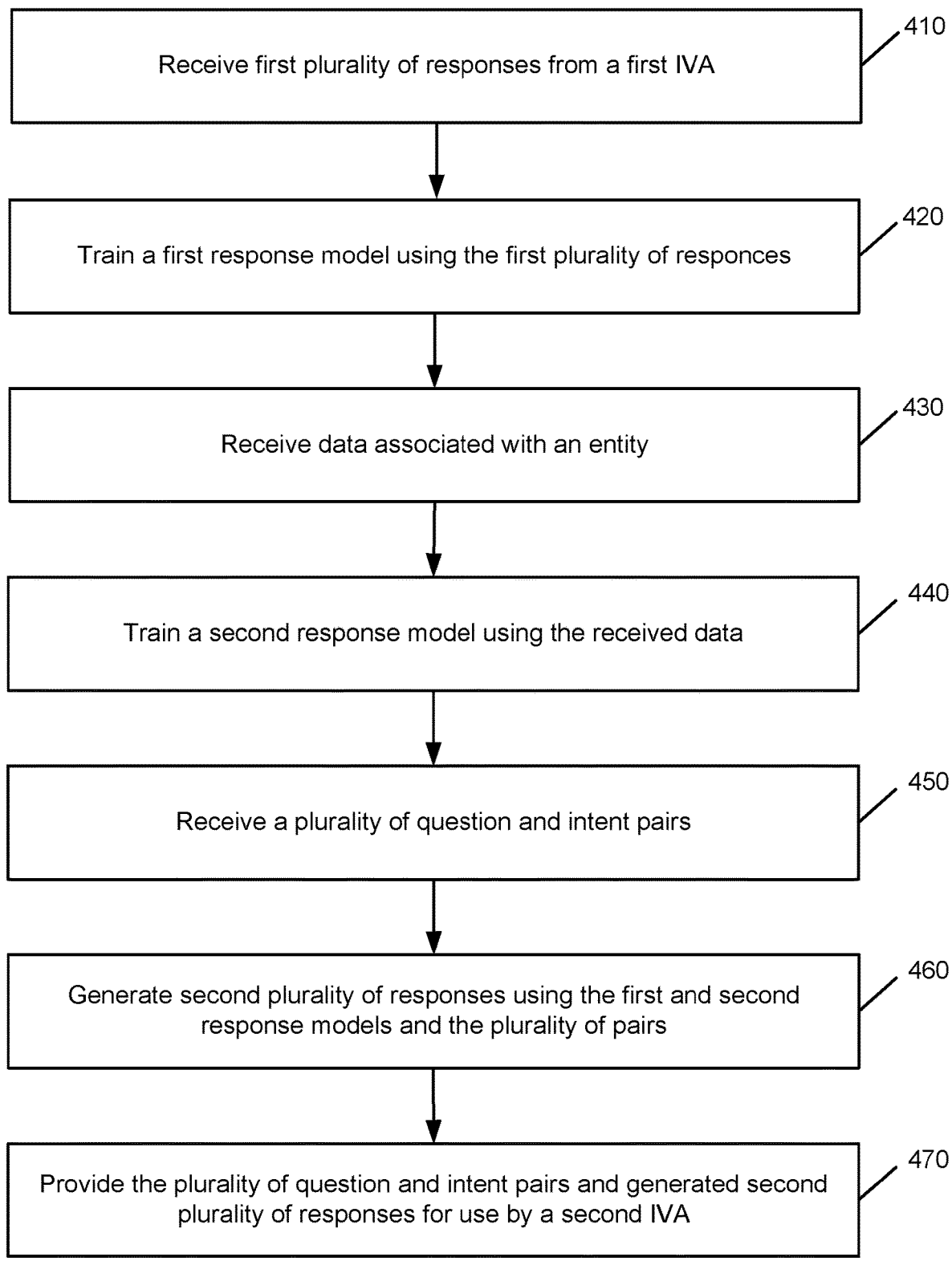
FIG. 4 is an operational flow of another implementation of a method for generating questions and/or responses for an intelligent virtual agent where example responses are available.

FIG. 4 is an operational flow of an implementation of a method 400 for generating questions and/or responses with example responses. The method 400 may be implemented by the question and response engine 205. The method 400 may be used to generate questions and/or responses for an IVA when suitable example responses are available from another IVA.

At 410, a first plurality of responses is received. The first plurality of responses 243 may be received by the training module 220. The first plurality of responses 243 may be received from a first IVA and may be responses that are provided by the first IVA. The first IVA may be associated with a similar topic, vertical, or purpose as the second IVA that is being trained.

At 420, a first response model is trained using the first plurality of responses. The first response model 221 may be trained by the training module 220 using the responses received from the first IVA.

At 430, data associated with the entity is received. The data 211 may be received by the data module 210. The data 211 may be received from websites, internal documents, and other sources associated with the entity. The data 211 may include chat or agent transcripts collected by the entity, for example.

At 440, a second response model is trained using the received data. The second response model 221 may be trained using at least some of the received data 211 by the training module 220. Any method for training a module using data 211 may be used. Depending on the embodiment, the training module 220 may first normalize or transform the data 211 into a standard format that can be used to train the model 221. In addition, the first response model 221 may be adjusted using the received data 211.

At 450, a plurality of question and intent pairs are received. The plurality of question and intent pairs may be received by the question module 230. Depending on the embodiment, the question and intent pairs may be received from an entity or company-specific database.

At 460, a second plurality of responses is generated using the first and second response models and the plurality of pairs. The second plurality of responses 243 may be generated by the response module 240 by feeding the question and intent pairs into both of the first response model 221 and the second response model 221. Depending on the embodiment, the second plurality of responses 243 may be reviewed by one or more human reviewers who may add, remove, or edit one or more of the responses 243.

At 470, the plurality of question and intent pairs and the second plurality of responses are provided for use by the second IVA. The plurality of question and intent pairs and the second plurality of responses may be provided by the response module 240.

FIG. 5 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 5, an exemplary system for implementing aspects described herein includes a computing device, such as computing device 500. In its most basic configuration, computing device 500 typically includes at least one processing unit 502 and memory 504. Depending on the exact configuration and type of computing device, memory 504 may be volatile (such as random access memory (RAM)), non-volatile (such as read-only memory (ROM), flash memory, etc.), or some combination of the two. This most basic configuration is illustrated in FIG. 5 by dashed line 506.

Computing device 500 may have additional features/functionality. For example, computing device 500 may include additional storage (removable and/or non-removable) including, but not limited to, magnetic or optical disks or tape. Such additional storage is illustrated in FIG. 5 by removable storage 508 and non-removable storage 510.

Computing device 500 typically includes a variety of computer readable media. Computer readable media can be any available media that can be accessed by the device 500 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 504, removable storage 508, and non-removable storage 510 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media may be part of computing device 500.

Computing device 500 may contain communication connection(s) 512 that allow the device to communicate with other devices. Computing device 500 may also have input device(s) 514 such as a keyboard, mouse, pen, voice input device, touch input device, etc. Output device(s) 516 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for generating responses for use by an intelligent virtual assistant comprising:
   receiving a first plurality of responses used by a first intelligent virtual assistant for a first entity by a computing device;
   receiving data associated with a second entity by the computing device, wherein the received data is from one or more internal knowledge bases associated with the second entity;
   training a machine learning question model using at least some of the received data by the computing device;
   generating a plurality of questions by the computing device using the machine learning question model, wherein each question of the plurality of questions simulates a question from a customer of the second entity to the first intelligent virtual assistant;
   assigning an intent to each question of the plurality of questions by the computing device;
   training a first machine learning response model using at least some of the received data by the computing device and without using the first plurality of responses;
   training a second machine learning response model to generate responses for use by the second intelligent virtual assistant using at least some of the first plurality of responses used by the first intelligent virtual assistant and without using the received data by the computing device;
   generating a plurality of responses using the first machine learning response model, the second machine learning response model, each question from the plurality of questions, and the assigned intents by the computing device; and
   providing the questions of the plurality of questions, the assigned intents, and the generated plurality of responses, for use by a second intelligent virtual assistant for the second entity by the computing device.

2. The method of claim 1, further comprising providing the plurality of questions to a human reviewer.

3. The method of claim 1, wherein assigning an intent to each question comprises generating a mapping of questions to intents.

4. The method of claim 3, further comprising providing the mapping to a human reviewer.

5. The method of claim 1, further comprising providing the generated responses to a human reviewer.

6. The method of claim 1, further comprising transforming the received data into a format used by the machine learning question model or the first machine learning response model.

7. The method of claim 1, wherein assigning an intent to a question comprises providing the question to the first intelligent virtual assistant and receiving the intent from the first intelligent virtual assistant.

8. The method of claim 1, further comprising scraping the received data from one or more knowledge bases associated with the second entity.

9. The method of claim 1, wherein the first plurality of responses is received from one or more of the first intelligent virtual assistant, one or more call transcripts, or the one or more internal knowledge bases.

10. A system for generating responses for use by an intelligent virtual assistant comprising:
    at least one processor; and
    a non-transitory computer readable medium comprising instructions that, when executed by the at least one processor, cause the system to:
    receive a first plurality of responses used by a first intelligent virtual assistant for a first entity;
    receive data associated with a second entity, wherein the received data is from one or more internal knowledge bases associated with the second entity;
    train a machine learning question model using at least some of the received data;
    generate a plurality of questions using the machine learning question model, wherein each question of the plurality of questions simulates a question from a customer of the second entity to the first intelligent virtual assistant;
    assign an intent to each question of the plurality of questions;
    train a first machine learning response model using at least some of the received data;
    train a second machine learning response model to generate responses for use by a second intelligent virtual assistant using at least some of the first plurality of responses used by the first intelligent virtual assistant and without using the received data;
    generate a plurality of responses using the first machine learning response model, the second machine learning response model, each question from the plurality of questions, and the assigned intents by the computing device; and
    provide the questions of the plurality of questions, the assigned intents, and the generated plurality of responses, or use by the second intelligent virtual assistant for the entity.

11. The system of claim 10, further comprising instructions that, when executed by the at least one processor, cause the system to provide the plurality of questions to a human reviewer.

12. The system of claim 10, wherein assigning an intent to each question comprises generating a mapping of questions to intents.

13. The system of claim 12, further comprising instructions that, when executed by the at least one processor, cause the system to provide the mapping to a human reviewer.

14. The system of claim 10, further comprising instructions that, when executed by the at least one processor, cause the system to provide the generated plurality of responses to a human reviewer.

15. The system of claim 10, further comprising instructions that, when executed by the at least one processor, cause the system to transform the received data into a format used by the machine learning question model or the first machine learning response model.

16. A non-transitory computer readable medium comprising instructions that, when executed by at least one processor, cause a system to:
    receive a first plurality of responses used by a first intelligent virtual assistant for a first entity;
    receive data associated with a second entity, wherein the received data is from one or more internal knowledge bases associated with the second entity;
    train a machine learning question model using at least some of the received data;
    generate a plurality of questions using the machine learning question model, wherein each question of the plurality of questions simulates a question from a customer of the second entity to the first intelligent virtual assistant;
    assign an intent to each question of the plurality of questions;
    train a first machine learning response model using at least some of the received data;
    train a second machine learning response model to generate responses for use by a second intelligent virtual assistant using at least some of the first plurality of responses used by the first intelligent virtual assistant and without using the received data;
    generate a plurality of responses using the first machine learning response model, the second machine learning response model, each question from the plurality of questions, and the assigned intents by the computing device; and
    provide the questions of the plurality of questions, the assigned intents, and the generated plurality of responses, for use by the second intelligent virtual assistant for the entity.

17. The computer-readable medium of claim 16, further comprising instructions that, when executed by the at least one processor, cause the system to provide the plurality of questions to a human reviewer.

18. The computer-readable medium of claim 16, wherein assigning an intent to each question comprises generating a mapping of questions to intents.

19. The computer-readable medium of claim 18, further comprising instructions that, when executed by the at least one processor, cause the system to provide the mapping to a human reviewer.

20. The computer-readable medium of claim 16, further comprising instructions that, when executed by the at least one processor, cause the system to provide the generated plurality of responses to a human reviewer.

* * * * *